(12) United States Patent
Zhou et al.

(10) Patent No.: US 9,855,781 B2
(45) Date of Patent: Jan. 2, 2018

(54) PRINTABLE MEDIUM

(71) Applicant: Hewlett-Packard Development Company, L.P., Houston, TX (US)

(72) Inventors: Xiaoqi Zhou, San Diego, CA (US); Paul C. Landrum, San Diego, CA (US); Xulong Fu, San Diego, CA (US); Francois K. Pirayesh, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/896,909

(22) PCT Filed: Jul. 15, 2013

(86) PCT No.: PCT/US2013/050456
§ 371 (c)(1),
(2) Date: Dec. 8, 2015

(87) PCT Pub. No.: WO2015/009271
PCT Pub. Date: Jan. 22, 2015

(65) Prior Publication Data
US 2016/0152060 A1    Jun. 2, 2016

(51) Int. Cl.
*D06P 3/24* (2006.01)
*B41M 5/50* (2006.01)
(Continued)

(52) U.S. Cl.
CPC .......... *B41M 5/504* (2013.01); *B32B 5/022* (2013.01); *B32B 5/024* (2013.01); *B32B 5/026* (2013.01); *B32B 5/26* (2013.01); *B32B 7/12* (2013.01); *B32B 25/14* (2013.01); *B32B 27/304* (2013.01); *B32B 27/306* (2013.01);
(Continued)

(58) Field of Classification Search
None
See application file for complete search history.

(56) References Cited

U.S. PATENT DOCUMENTS 4,770,928 A * 9/1988 Gaworowski ......... B29C 70/086
101/401.1
5,503,076 A * 4/1996 Yeo .......................... D04H 1/593
101/483
(Continued)

FOREIGN PATENT DOCUMENTS

JP    2001509445    7/2001
JP    2001270230    10/2001
(Continued)

OTHER PUBLICATIONS

International Search Report and Written Opinion for International Application No. PCT/US2013/050456 dated Apr. 29, 2014, 11 pages.

*Primary Examiner* — Alejandro Valencia
(74) *Attorney, Agent, or Firm* — HP Inc. Patent Department (57) ABSTRACT

A printable medium with a supporting base substrate that has, on its image side, a substrate sizing layer and an image receiving layer, and having, on its back-side a fabric backing and barrel layer with flame retardancy. Also disclosed are the method for making such printable medium and the method for producing printed images.

19 Claims, 1 Drawing Sheet

(51) Int. Cl.

| | |
|---|---|
| *B41M 5/52* | (2006.01) |
| *B41M 3/18* | (2006.01) |
| *B32B 5/02* | (2006.01) |
| *B32B 5/26* | (2006.01) |
| *B32B 7/12* | (2006.01) |
| *B32B 25/14* | (2006.01) |
| *B32B 27/30* | (2006.01) |
| *B32B 27/32* | (2006.01) |
| *B32B 27/36* | (2006.01) |
| *B32B 27/38* | (2006.01) |
| *B32B 27/40* | (2006.01) |
| *D21H 27/20* | (2006.01) |

(52) U.S. Cl.
CPC ............ *B32B 27/308* (2013.01); *B32B 27/32* (2013.01); *B32B 27/36* (2013.01); *B32B 27/38* (2013.01); *B32B 27/40* (2013.01); *B41M 3/18* (2013.01); *B41M 5/502* (2013.01); *B41M 5/506* (2013.01); *B41M 5/5218* (2013.01); *B41M 5/5236* (2013.01); *B41M 5/5254* (2013.01); *B32B 2260/021* (2013.01); *B32B 2260/046* (2013.01); *B32B 2262/0238* (2013.01); *B32B 2262/0246* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/0292* (2013.01); *B32B 2262/062* (2013.01); *B32B 2262/065* (2013.01); *B32B 2262/067* (2013.01); *B32B 2264/10* (2013.01); *B32B 2264/102* (2013.01); *B32B 2264/104* (2013.01); *B32B 2274/00* (2013.01); *B32B 2307/308* (2013.01); *B32B 2307/3065* (2013.01); *B32B 2307/54* (2013.01); *B32B 2307/5825* (2013.01); *B32B 2307/732* (2013.01); *B32B 2307/734* (2013.01); *B32B 2307/75* (2013.01); *B32B 2419/00* (2013.01); *B32B 2451/00* (2013.01); *B41M 5/508* (2013.01); *D21H 27/20* (2013.01)

(56) References Cited

U.S. PATENT DOCUMENTS

| | | | |
|---|---|---|---|
| 6,589,633 B1 * | 7/2003 | Ino | D06M 11/78 428/195.1 |
| 7,132,142 B2 | 11/2006 | Truog et al. | |
| 8,563,100 B1 * | 10/2013 | Zhou | B41M 5/5218 428/32.16 |
| 2004/0091692 A1 | 5/2004 | Parrinello et al. | |
| 2005/0003174 A1 | 1/2005 | Ikeda et al. | |
| 2006/0257593 A1 | 11/2006 | Haenen | |
| 2009/0176087 A1 * | 7/2009 | Yoon | B29C 47/0021 428/337 |
| 2009/0239027 A1 | 9/2009 | Oldorff et al. | |
| 2011/0076470 A1 | 3/2011 | Zaveri | |
| 2011/0250368 A1 | 10/2011 | Shih et al. | |

FOREIGN PATENT DOCUMENTS

| | | |
|---|---|---|
| JP | 2004155207 | 6/2004 |
| WO | WO 03/028994 | 4/2003 |
| WO | WO 2012/031117 | 3/2012 |

* cited by examiner

PRINTABLE MEDIUM

BACKGROUND

Inkjet printing technology has expanded its application to high-speed, commercial and industrial printing, in addition to home and office usage, because of its ability to produce economical, high quality, multi-colored prints. This technology is a non-impact printing method in which an electronic signal controls and directs droplets or a stream of ink that can be deposited on a wide variety of medium substrates. Inkjet printing technology has found various applications on different substrates including, for examples, cellulose paper, metal, plastic, fabric, and the like. The substrate plays a key role in the overall image quality and permanence of the printed images. Large format print medium becomes more and more popular and finds use in many applications such as wall coverings, banners, and signs of many types that can be printed to create images with one or more symbols, text and photographs. When printing on such substrates, challenges exist due to their specific nature. Durability and flame retardancy of the print medium and of the printed image thereon are in consideration for wall coverings for examples. Accordingly, investigations continue into developing medium substrates that can be effectively used for large format printing and which impart good mechanical resistance as well as fire resistance.

BRIEF DESCRIPTION OF THE DRAWING

The drawings illustrate various embodiments of the present printable medium and are part of the specification.

DETAILED DESCRIPTION

Before particular embodiments of the present disclosure are disclosed and described, it is to be understood that the present disclosure is not limited to the particular process and materials disclosed herein. It is also to be understood that the terminology used herein is used for describing particular embodiments only and is not intended to be limiting, as the scope of protection will be defined by the claims and equivalents thereof. In describing and claiming the present article and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. All percents are by weight (wt %) unless otherwise indicated. As used herein, "image" refers to marks, signs, symbols, figures, indications, and/or appearances deposited upon a material or substrate with either visible or an invisible ink composition. Examples of an image can include characters, words, numbers, alphanumeric symbols, punctuation, text, lines, underlines, highlights, and the like.

The present disclosure refers to a printable medium with a supporting base substrate having, on its image side, a substrate sizing layer and an image receiving layer, and having, on its back-side, a fabric backing and barrel layer with flame retardancy.

The printable medium, as disclosed herein, can be used as a wall covering material (e.g., wallpaper) for home or commercial use, for decoration or display as well as signs or banners and the like. In some examples, the printable medium of the present disclosure is a wall covering substrate. In some other examples, the printable medium is a wall covering substrate that contains a multi-layer composite structure. The composite structure includes laminated layers that form a non-image side and an image side on the printable medium. The non-image side, or backside, is the side that would face and attach to a wall, in a wall covering application, or even in a sign or banner application having a single image side. The image side is the side that includes material layers to receive, support and protect an image.

The term "wall covering," as used herein, means a large format print medium that has a length that is much larger than a width (or vice versa) relative to small format office paper or photo media products (e.g., letter, A4, legal, etc. sizes). For example, the wall covering may be provided in a roll that is 1.37 meters (54 inches) wide and 27.43 meters (30 linear yards) long. Moreover, the term "wall covering" means a print medium that supports various imaging materials and applications, for example, various types of inkjet inks and inkjet printing, for image formation, including digital printing. In addition, the term "wall covering" means a product that complies with federal and industry standards or specifications for wall coverings including, but may not be limited to, CCC-W-408A and D, ASTM F793 and CFFAW-101D. Under these standards, wall coverings have weight and durability requirements depending on which category or type that the wall covering falls within. Category I is for decorative only wall covering, while Category VI is for commercial serviceability wall covering. (Types I, II and III wall coverings are substantially equivalent to Categories, IV, V and VI, respectively, among the standards). The wall covering according to the principles described herein has wear and tear durability of Type-II, or possibly higher grade, wall coverings in accordance with the aforementioned standards and may meet or exceed established criteria for Type-II wall coverings under the aforementioned standards. Herein, the term "wall covering," "wall covering print medium," and "wall covering digital print medium" may be used interchangeably.

In some examples, the printable medium of the present disclosure, when used a wall covering, have a durability that may meet or exceed Type-II, commercial serviceability wall covering standards or specifications, to provide a durable Type-II wall covering that is also free of polyvinyl chloride (PVC), which is harmful to the environment. In some other examples, the printable medium, when used a wall covering in an in-door environmental, is able to meet "Fire Resistance or flame resistance" standards such as ASTM E84 for example. In yet some other examples, the printable medium, when used in a wall covering application, has a mechanical breaking strength that is within a range of at least 50 lb to about 60 lb; or within a range of about 55 lb to about 60 lb. The mechanical breaking strength in the Machine Direction (MD) can be between about 58 lb and about 60 lb and in the Cross Machine Direction (CMD) can be between about 55 lb to about 58 lb. Such measurements are made according to the ASTM D751 "Standard test method for coated fabrics". The printable medium, when used in a wall covering application, can have a minimum scrubbability resistance of 300 cycles, or maybe more, of linear abrasion. Such measurements are made according to the ASTM F793 "Standard test method for coated fabrics".

Figure 1:
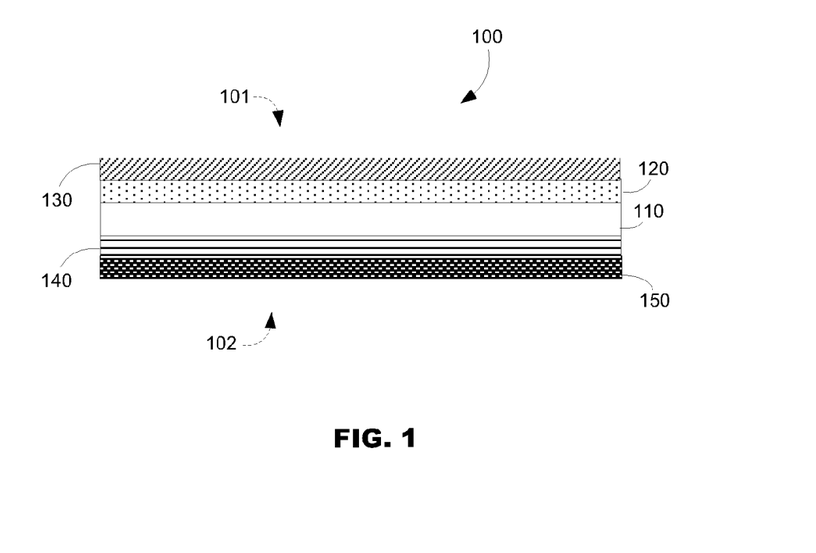
FIG. 1 is a cross-sectional view of the printable medium according to embodiments of the present disclosure.
Figure 2:
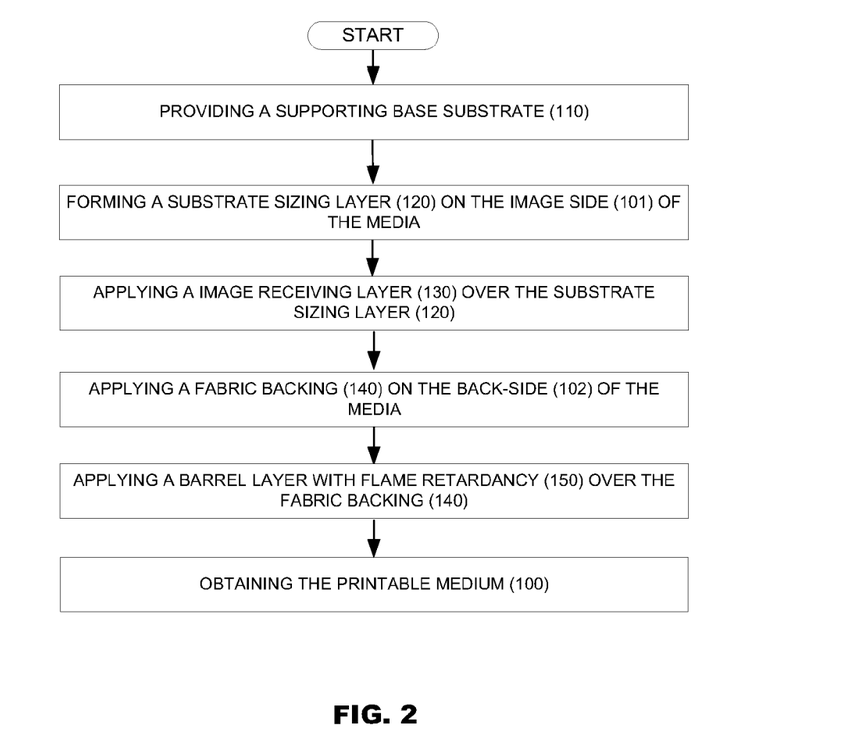
FIG. 2 is a flowchart illustrating the method for making the printable medium according to some embodiments of the present disclosure.

The printable medium can be an inkjet printable medium. The printable medium can thus be specifically designed to receive any inkjet printable ink, such as, for example, organic solvent-based inkjet inks or aqueous-based inkjet inks Examples of inkjet inks that may be deposited, established, or otherwise printed on the printable medium, include pigment-based inkjet inks, dye-based inkjet inks, pigmented latex-based inkjet inks, and UV curable inkjet inks FIG. 1 schematically illustrates an example of a printable medium (100) of the present disclosure. It is to be understood that the thickness of the various layers is exaggerated for illustrative purposes. The printable recording medium (100) has an image or printed side (101) and a backside or opposing side (102). The image side (101) of the medium is the side that includes material layers that will receive, support and protect an image. The backside, or opposing side, (102) is not designed for receiving printing image and is the side that would face and attach to a subject such as a panel, a board and a wall surface in a wall covering application, or even in a sign or banner application having a single image side. As illustrated in FIG. 1, the printable recording medium (100), encompasses a composite supporting base substrate (110), above which is applied a substrate sizing layer (120). An image receiving layer with (130) is applied over said substrate sizing layer (120). The image receiving layer (130) and the substrate sizing layer (120) are applied, only, on one side of the supporting base substrate (110). On the other side, i.e. backside or opposing side, of the composite supporting base substrate (110), a fabric backing (140) is applied. A barrel layer with flame retardancy (150) is applied over said fabric backing (140). FIG. 2 is a flowchart illustrating methods of making the recording medium such as described herein. Such method encompasses providing a supporting base substrate (110); forming a substrate sizing layer (120) on the image side (101) of the printable medium; applying a image receiving layer (130) over said substrate sizing layer (120); applying a fabric backing (140) on the back-side (101) of the printable medium; and, then, applying a barrel layer with flame retardancy (150) over said fabric backing (140).

The Printable Medium (100)

The printable medium has a supporting base substrate having, on its image side, a substrate sizing layer and an image receiving layer, and having, on its back-side, a fabric backing and a barrel layer with flame retardancy.

Supporting Base Substrate (110)

The printable medium encompasses a supporting base substrate (110) that has an image side (101) and a back side (102). Such supporting base substrate is a composite supporting core substrate. The word "supporting" refers herein to a substrate where the printing image can be formed on at least one side of the substrate, i.e. the image side (101), via an image receiving coating deposited on the surface of the support. The word "supporting" also refers to a physical objective of the substrate which is to carry the image with any desired geometry and size with excellent durability or mechanical strength. The word "composite" refers herein to a material made from at least two constituent materials, or layers, that have different physical and/or chemical properties from one another, and wherein these constituent materials/layers remain separate at a molecular level and distinct within the structure of the composite. The composite supporting core substrate can be made using paper making equipment. In some examples, the supporting base substrate of the present disclosure encompasses at least two different constituent materials.

The first constituent material, of the supporting base substrate, can be a synthetic polymeric fiber. Such synthetic polymeric fiber has an average length within the range of about 0.5 millimeter (mm) to about 8 mm. In some examples, the synthetic polymeric fiber has a length greater than 6 mm, provided that the synthetic polymeric fiber does not negatively impact the formation of the composite supporting core using the paper making equipment, for example on a screen of a paper mill. In some other examples, the synthetic polymeric fiber has diameter within the range of about 10 micrometers or microns ($\mu$m) to about 60 $\mu$m with an average length within the range of about 2 mm and about 4 mm. The amount of the synthetic polymeric fiber, in the composite supporting core, depends on the length of the fiber. For instance, the use of longer synthetic fibers may allow for improvement in dimensional stability of the composite structure with lower amounts of the synthetic polymeric fibers being used.

The second constituent material, of the supporting base substrate, can be a natural fiber. The natural fiber includes natural cellulose fiber from either hardwood species or hardwood species and softwood species. In some examples, a ratio of hardwood fiber to softwood fiber is within a range of about 100:0 to about 50:50. The natural cellulose fiber may be processed into various pulps including, but not limited to, wood-free pulp (such as bleached or unbleached Kraft chemical pulp and bleached or unbleached sulfite chemical pulp); wood-containing pulp (such as one or more of ground-wood pulp, thermo-mechanical pulp, and chemo-thermo-mechanical pulp); pulp of non-wood natural fiber (such as one or more of bamboo fiber, bagasse fiber, recycled fiber, cotton fiber); a combination of two or more of these pulps, or a mixture of two or more of these pulps.

In some examples, the supporting base substrate contains a synthetic polymeric fiber as a first constituent material and a natural fiber as a second constituent material. The amount of synthetic polymeric fiber, in the supporting base substrate, can be within a range of about 5 wt % to about 80 wt % by weight of total fibers in the supporting base substrate; or, can be within a range of about 10 wt % to about 30 wt %.

The supporting base substrate may further contain a polymeric binder. The polymeric binder may be pre-mixed with one or both of the synthetic polymeric fiber and the natural fiber. Examples of polymeric binder include, but are not limited to, water soluble polymers, such as polyvinyl alcohol, starch derivatives, gelatin, cellulose derivatives, acrylamide polymers; water-dispersible polymers, such as acrylic polymers or copolymers, vinyl acetate latex, polyesters, vinylidene chloride latex, and styrene-butadiene or acrylonitrile-butadiene copolymer latex. The polymeric binder can also be a combination of two or more of the above polymeric binders; or a mixture of two or more of the above polymeric binders. The polymeric binder may have a glass transition temperature (Tg) within a range of about −30° C. to about 10° C. The Tg of the polymeric binder can also be within a range of −20° C. to about 10° C. or −10° C. to about 10° C. In some examples, the ratio of polymeric binder to the natural cellulose fiber, in the supporting base substrate, is in the range of about 1:20 to about 1:1, or, in some other examples, in the range of about 1:10 to about 1:1, or, in yet some other examples, in the range of about 1:5 to about 1:1.

Moreover, the supporting base substrate may further contain aqueous coupling agents in view of improving binding between the fibers. Representative examples of commercially available coupling agents include, but are not limited to, Dow Corning® Z 6032, Dow Corning®Z 6030, and Dow Corning® Z 6040 silanes (from Dow Corning, Inc., Mich., USA), or Struktol®SCA 98, Struktol® SCA 930, and Struktol® SCA 960 organosilanes (from Struktol Company of America, Ohio, USA).

The supporting base substrate may further include inorganic compounds on the form of particles with various morphologies. The average particle size of the inorganic compounds is within the range of about 0.05 to 12 about micrometers (μm), or within the range of about 0.1 to about 1.5 μm. The materials that can be used as inorganic powder include, but are not limited to, carbonates like grounded calcium carbonate, precipitated calcium carbonate, clays, titanium dioxide, hydrated alumina (e.g. aluminum trihydrate), barium sulfate, alumina, zinc oxide, and/or combinations thereof. The total weight percentage of inorganic compounds is between 2% to 25 wt % of the supporting base substrate.

The supporting base substrate can be a single sheet having different constituent materials. In some examples, the supporting base substrate is a lamination of multiple sheets which contains multiple constituents via an adhesive. The adhesive can be selected from any materials having good adhesion property to the support sheets. Example of such adhesives include, but are not limited to, acrylic latex, polyurethane latex, polyethylene-acetate copolymer latex, epoxy latex and various rubber latex.

The supporting base substrate can contain polymeric fiber and can be made in a fourdrinier type paper machine. The polymeric fiber can be first cut to the desired length, and premixed with binder, then added to the wood fiber in pre-determined ratio. The final fiber mixture containing both natural wood fiber and polymeric fiber can be diluted to about 1% concentration. In some instance, the diluted fiber mix is pumped through paper machine head-box and forms a sheet on an endless forming wire to drain the water, and is dried by both mechanical press and hot dry can. The final moisture can be of around 5%. The polymeric fiber containing substrate can be optionally calendered on line or off-line to reach desired smoothness.

Substrate Sizing Layer (120)

The printable medium encompasses a substrate sizing layer (120) that is directly applied above the supporting base substrate (110), on the image side (101) of the printable medium. Such substrate sizing layer (120) is sandwiched between the top image receiving layer (130) and the supporting base substrate (110). In some examples, the coat weight of the substrate sizing layer (120) of the printable medium is within a range of about 0.1 gsm to about 10 gsm. In some other examples, the coat weight of the substrate sizing layer (120) is within the range of about 1 gsm to about 8 gsm. In some examples, the substrate sizing layer (120) contains starch or modified starch products and a flame retardant agent. The substrate sizing layer (120) can also contains starch products that are partially or completely replaced by a binder, as described below in the image receiving layer section, which can be the same or different chemical components. It is believed that the function of the starch products and/or binders is to form a thin and continuous layer together with a flame retardant agent, in order to increase the hydrophobicity and flame resistance of the supporting base substrate.

As flame retardant agent, it is meant herein any substance that inhibits or reduces flammability or delays their combustion of the medium containing it. Examples of flame retardant agent that can be used in the substrate sizing layer (120) include phosphorus-containing compounds, nitrogen-containing compounds and organophosphate compounds. Phosphorus-containing compounds encompass organic and inorganic phosphates, phosphonates, and/or phosphinates with different oxidation states. Nitrogen-containing compounds that can likewise be used include melamines (including melamine derivatives) such as melamine, melamine cyanurate, melamine polyphosphate, melem, and melon. Examples of organophosphate compounds include aliphatic phosphates and phosphonates and aromatic phosphonates. The organophosphate compound can be an organophosphonate with four oxygen atoms attached to the central phosphorus; an aliphatic, aromatic, or polymeric organophosphate with 3 oxygen atoms attached to the central phosphorus, or an organophosphinate with 2 oxygen atoms attached to the central phosphorus atom. Specific examples of organophosphates include diphenyl-phosphate (TPP), resorcinol bis(diphenylphosphate) (RDP), bisphenol A diphenyl-phosphate (BADP), tricresyl-phosphate (TCP); dimethyl-phosphonate, 2,2-Oxybis[5,5-dimethyl-1,3,2-dioxaphosphorinane]2,2-disulphide, bisphenol-A-bis(diphenyl-phosphate)diethyl-phosphonate, diethylphosphinate aluminum salt, dimethyl-propyl-phosphonate, diethyl N,N-bis (2-hydroxyethyl), aryl-phosphates, cresyl diphenyl-phosphate (diphenyl-tolyl-phosphate); cyclic phosphonate; diethyl-ethyl phosphonate, dimethyl-methyl-phosphonate; diphenyl (2-ethylhexyl) phosphate or the like. Compounds having a molecular structure that includes both nitrogen and phosphorus also show acceptable properties. Examples of such compounds include APP (ammonium polyphosphate), PDSPB (poly (4, 4-diaminodiphenyl methane spirocyclic pentaerythritol bisphosphonate)), DTPAB (1, 4-di (diethoxy thiophosphamide benzene), aminomethyl phosphonate, ethylenediamine-o-phosphate, modified guanidine phosphate, melamine phosphate, melamine polyphosphate, melamine-poly(aluminum phosphate) and mixtures thereof. Compounds having a molecular structure that includes both metal element and phosphorus also show acceptable properties. Examples of such compounds include aluminum diethylphosphinate, calcium diethylphosphinate and mixtures thereof. The compounds that contain both phosphorus and a halogen show less adverse environmental impact. Such compounds include tris(2,3-dibromopropyl) phosphate and chlorinated organophosphates such as tris(1,3-dichloro-2-propyl)phosphate (TDCPP), tetrekis(2-chlorethyl) dichloro-isopentyldiphosphate, tris (1,3-dichloroisopropyl) phosphate, tris (2-chloroisopropyl) phosphate, tris (2-chloroisopropyl) phosphate. The fire retardant agent can be also selected from mineral powders such as aluminum hydroxide (ATH), magnesium hydroxide, huntite and hydromagnesite hydrates, red phosphorus, boehmite (aluminum oxide hydroxide) and boron compounds, like borates.

In some examples, flame retardant agents, that can be used herein, have a water solubility limitation. In the ambient condition, the water solubility can be less than 0.5 g/100 g $H_2O$, or less than 0.15 g/100 g H2O. Flame retardant agents with higher solubility are found to migrate easily on to the surface of the image receiving layer and decrease ink adhesion and image durability. The flame retardant used in the substrate sizing layer (120) can be in a physical form of fine powder so that it can be easily dispersed with starch and forms a smooth layer for image receiving layer (130) applied on top. The ratio of the starch and/or binder, to flame retardant agent, in the substrate sizing layer (120), may be ranging from 3 to 97, or from to 80 to 20.

Image Receiving Layer (130)

The printable medium (100) includes also an image receiving layer (130). Said image receiving layer (130) is applied above the substrate sizing layer (120) on the image side (101) of the printable medium. The image receiving layer (130) is considered as the top layer of the printable medium, as described herein, and is the surface where the ink composition is deposited. Such image receiving layer is configured to receive imaging material, such as, for example, an ink that is printed in the form of an image. The coat weight of the image receiving layer (130) may range, for example, from about 5 gsm to about 30 gsm or may ranges from about 10 gsm to about 20 gsm. Once coated, the image receiving composition dries to form a layer (i.e., the image receiving layer). In some examples, the thickness of the image receiving layer ranges from about 5 microns (μm) to about 40 microns (μm). In some examples, the image receiving layer (130) has a smooth surface with a PPS smoothness that is less than 1.5 micro (μm) or less than 0.8 micro (μm). It is believed that any surface with roughness greater than this range will results an undesirable image quality like mottling.

In some examples, the image receiving layer (130) contains pigment fillers, polymeric binders and latex film-forming agents. The pigment fillers that are present in the image receiving layer (130) can be either inorganic and/or organic particulates, either in solids powder form or in a dispersed slurry form. Examples of inorganic pigment filler include, but are not limited to, aluminum silicate, kaolin clay, a calcium carbonate, silica, alumina, boehmite, mica, talc, and combinations or mixtures thereof. The inorganic pigment filler can include clay or a clay mixture. The inorganic pigment filler can include a calcium carbonate or a calcium carbonate mixture. The calcium carbonate may be one or more of ground calcium carbonate (GCC), precipitated calcium carbonate (PCC), modified GCC, and modified PCC. The inorganic pigment fillers may also include a mixture of a calcium carbonate and clay. In some examples, the inorganic pigment fillers include two different calcium carbonates pigments (e.g., GCC and PCC). Examples of organic pigment filler include, but are not limited to, particles, either existing in a dispersed slurry or in a solid powder, of polystyrene and its copolymers, polymethyacrylates and their copolymers, polyacrylates and their copolymers, polyolefins and their copolymers, such as polyethylene and polypropylene, a combination of two or more of the polymers. The pigments, for the image receiving layer (130), may be chosen from silica gel (e.g., Silojet®703C available from Grace Co.), modified (e.g., surface modified, chemically modified, etc.) calcium carbonate (e.g., Omyajet®B6606, C3301, and 5010, all of which are available from Omya, Inc.), precipitated calcium carbonate (e.g., Jetcoat®30 available from Specialty Minerals, Inc.), and combinations thereof. The pigments can be present in an amount ranging, for example, from about 65 wt % to about 85 wt % of the total wt % of the image receiving layer (130).

The polymeric binder, present in the image receiving layer (130), can be an aqueous based binder. Examples of suitable polymeric binders include polyvinyl alcohol, styrene-butadiene emulsion, acrylonitrile-butadiene latex, or any combinations. Moreover, in addition to the above binders, other aqueous binders can be added including: starch (including oxidized starch, cationized starch, esterified starch, enzymatically denatured starch and so on), gelatin, casein, soybean protein, cellulose derivatives including carboxy-methyl cellulose, hydroxyethyl cellulose and the like; acrylic emulsion, vinyl acetate emulsion, vinylidene chloride emulsion, polyester emulsion, and polyvinylpyrrolidone. Other examples of suitable polymeric binders include aqueous based binders such as polyvinyl alcohol (examples of which include Kuraray poval®235, Mowiol® 40-88, and Mowiol® 20-98 available from Kuraray America, Inc.), styrene-butadiene emulsions, acrylonitrile-butadiene latex, and combinations thereof The amount of the polymeric binder, that is present in the image receiving layer (130), can represents from about 5 to about 40 parts per 100 parts of pigment filler by dry weight; or can represent from about 10 to about 30 parts per 100 parts of pigment filler by dry weight.

The image receiving layer (130) also contains a latex film-forming agent. It is to be understood that the film-forming agent may be capable of lowering the elastic modulus of polymer particulates (specifically found in latex inks to be printed on the printable medium) and providing temporary plasticization, which promotes polymer chain motion of the polymer particulates during the film forming process. As such, the polymer particulates are more readily able to coalesce, and therefore the film-forming agent can improve the film-forming properties of the polymer particulates. In some examples, the film-forming agents that are part of the image receiving layer (130), include, citrate compounds, sebacate compounds, ethoxy alcohols, glycol oligomers, glycol polymers, glycol ether, glycerol acetals, anionic, cationic or non-ionic surfactants having a more than 12 carbon backbones (e.g., propylene glycol monoester of C-18 fatty acids and propylene glycol mono oleate (each of which is commercially available under the trade name Loxanol® by BASF Corp), cyclic amides, and combinations thereof. The cyclic amides may be β-lactams (e.g., clavam, oxacephem, cephem, penam, carbapenam, and monobactam), γ-lactams, δ-lactams (e.g., caprolactam and glucarolactam), and combinations thereof. The film-forming agent can be a cyclic amide like lactams such as β-lactam, γ-lactam, and δ-lactam, and mixtures thereof. The latex film-forming agent can also be a γ-lactam. Representative examples of a γ-lactam include N-methyl-2-pyrrolidone, 5-methyl-2-pyrrolidone, and 2-pyrrolidone.

A ratio of the amount of pigment filler to an amount of film-forming agent may be within a range of about 200:1 to about 10:1; or may also be within the range of about 150:1 to about 12:1 or within the range of about 100:1 to about 30:1.

The image receiving layer may further include other additives, e.g., processing aids and property modifiers. Examples of additives that may be incorporated include crosslinking agent, surfactant, defoamer, fixing agent, and/or pH adjuster. The image receiving layer might include from about 1 wt % to about 3 wt % of boric acid as a crosslinking agent, from about 0.5 wt % to about 2 wt % of glycerol, and from about 1 wt % to about 5 wt % of a dye fixing agent (such as, e.g., Locron®P available from Clariant International Ltd). The image receiving layer may also include a defoamer in an amount ranging from about 0.05 wt % to about 0.2 wt % of the total wt % of the image receiving layer. Examples of the defoamer include Foamaster® 1410, 1420, 1430, all of which are available from BASF Corp.

Fabric Backing Layer (140)

The printable medium encompasses a supporting base substrate (110) and a fabric backing layer (140) that is directly applied on the supporting base substrate (110), on the back side (102) of said printable medium. Such fabric backing layer (140) is sandwiched between the barrel layer with flame retardancy (150) and the supporting base substrate (110). Without being linked by any theory, it is believed that the fabric backing layer (140) is functionalized to provide the mechanical tensile and tear strength to meet type II industrial standard. (As per ASTM F793 standards, Category 5 "Type II" durability has a minimum breaking or tensile strength of 50 lbs in the machine direction (MD) and 55 lbs in the cross machine direction (CMD). As per ASTM D751 standards, Type II has a minimum tear resistance value of 400 gf for both MD and CMD).

The term "fabric", as used herein, is intended to mean a textile, a cloth, a fabric material, fabric clothing, or another fabric product that has mechanical strength and air permeability. The term "fabric structure" is intended to mean a structure having warp and weft that is woven, non-woven, knitted, tufted, crocheted, knotted or pressed, for example. The terms "warp" and "weft" refers to weaving terms that have their ordinary means in the textile arts. As used herein, warp refers to lengthwise or longitudinal yarns on a loom, while weft refers to crosswise or transverse yarns on a loom.

The fabric backing layer (140) has a fabric surface that may be flat or that exhibits pile. The fabric structure may have a surface roughness or texture to form airflow channels or pathways, at the interface with the wall surface to which the fabric is to be attached, to facilitate airflow. Without behind linked by any theory, it is believed that adequate airflow helps to prevent formation of some detrimental biological growth, such as mold and mildew formation. Adequate airflow may be validated by two separate methods. A first method uses fluid-flow measurements per ASTM E96, which determines the relative water-vapor transmission rate through a medium. A second method is per ASTM D6329 in combination with UL GreenGuard Test Method P040, which determines an ability of the medium to grow and sustain mold and mildew formations.

In some examples, the fabric backing layer (140) is a woven, non-woven, knitted or tufted fabric structure. Examples of woven fabric structures include, but are not limited to, satin, poplin, and crepe weave. The fabric can be a knitted textile including, but not limited to, circular knit, warp knit, and warp knit with a micro denier face. The fabric backing can also be a non-woven, non-knitting fabric where plurality of fibers or filaments are bonded together and interlocked together by a chemical treatment process (e.g., a solvent treatment and adhesion), a mechanical treatment process (e.g., embossing), a thermal treatment process, or a combination of two or more of these processes. The fabric backing layer (140) may be made of one or both of natural fibers and synthetic fibers. Natural fibers that may be used include wool, cotton, silk, linen, jute, flax, or hemp. Additional natural fibers that may be used include rayon fibers, or those of thermoplastic aliphatic polymeric fibers derived from renewable resources, including, but not limited to, corn starch, tapioca products, or sugarcanes. In some examples, the fiber used in the fabric backing includes a combination of two or more from the above-listed natural fibers, a combination of any of the above-listed natural fibers with another natural fiber or with synthetic fiber. The synthetic fiber that may be used in the fabric backing layer (140) is polymeric fiber including, but not limited to, polyvinyl chloride (PVC)-free fibers made of polyester, polyamide, polyimide, polyacrylic, polypropylene, polyethylene, polyurethane, polystyrene, polyaramid, e.g., Kevlar®, polytetrafluoroethylene, e.g., Teflon® (both trademarks of E. I. du Pont de Nemours and Company), fiberglass, polytrimethylene, polycarbonate, polyester terephthalate, or polybutylene terephthalate. The fiber used herein includes a combination of two or more of the above-listed polymeric fibers, a combination of any of the above-listed polymeric fibers with another polymeric fiber or with natural fiber. In some examples, the synthetic fiber includes modified polymeric fibers from above-listed polymers. The term "modified fibers"refers to one or both of the polymeric fiber and the fabric as a whole having underwent a chemical or physical process such as, but not limited to, one or more of a copolymerization with monomers of other polymers, a chemical grafting reaction to contact a chemical functional group with one or both the polymeric fiber and a surface of the fabric, a plasma treatment, a solvent treatment, for example acid etching, and a biological treatment, for example an enzyme treatment or antimicrobial treatment to prevent biological degradation. The term "PVC-free" means no polyvinyl chloride (PVC) polymer or vinyl chloride monomer units present in the wall covering or the composite structure.

The fabric backing layer (140) can contain both natural fibers and synthetic polymeric fibers. In some examples, the amount of synthetic fibers represents from about 20% to about 90% of the total amount of fibers. In some other examples, the amount of natural fibers represents from about 10% to about 80% of the total amount of fibers. The fabric backing layer (140) may contain additives including, but not limited to, one or more of colorant (e.g., pigments, dyes, tints), antistatic agents, brightening agents, nucleating agents, antioxidants, UV stabilizers, fillers, flame retardants, and lubricants, for example. The fabric backing layer (140) can include an adhesive compound. The adhesive compound, used for laminate the composite supporting base substrate (110) and the fabric backing layer (140), can be any adhesive which is able to bonder two material together with adequate strength. In some examples, the adhesive compound is an aqueous latex adhesive. The adhesive compound can be selected from a wide variety of resin latex and include, but are not limited to, resins formed by polymerization of hydrophobic addition monomers. Examples of hydrophobic addition monomers include, but are not limited to, $C_1$-$C_{12}$ alkyl acrylate and methacrylate (e.g., methyl acrylate, ethyl acrylate, n-propyl acrylate, isopropyl acrylate, n-butyl acrylate, isobutyl acrylate, sec-butyl acrylate, tert-butyl acrylate, 2-ethylhexyl acrylate, octyl arylate, methyl methacrylate, ethyl methacrylate, n-propyl methacrylate, isopropyl methacrylate, n-butyl methacrylate, isobutyl methacrylate, sec-butyl methacrylate, tert-butyl methacrylate), and aromatic monomers (e.g., styrene, phenyl methacrylate, o-tolyl methacrylate, m-tolyl methacrylate, p-tolyl methacrylate, benzyl methacrylate), hydroxyl containing monomers (e.g., hydroxyethylacrylate, hydroxyethylmthacrylate), carboxylic containing monomers (e.g., acrylic acid, methacrylic acid), vinyl ester monomers (e.g., vinyl acetate, vinyl propionate, vinylbenzoate, vinylpivalate, vinyl-2-ethylhexanoate, vinylversatate), vinyl benzene monomer, $C_1$-$C_{12}$ alkyl acrylamide and methacrylamide (e.g., t-butyl acrylamide, sec-butyl acrylamide, N,N-dimethylacrylamide), crosslinking monomers (e.g., divinyl benzene, ethyleneglycoldimethacrylate, bis(acryloylamido)methylene), and combinations thereof. Polymers made from the polymerization and/or copolymerization of alkyl acrylate, alkyl methacrylate, vinyl esters, and styrene derivatives may also be useful.

Barrel Layer with Flame Retardancy (150)

The printable medium encompasses a supporting base substrate (110) and a barrel layer with flame retardancy (150) that is directly applied above the fabric backing layer (140) on the back side (102) of the printable medium. The barrel layer with flame retardancy (150) has a coat-weight in an amount representing from about 2 to about 30 gsm or representing from about of 5 to about 10 gsm. The barrel layer with flame retardancy (150) contains a flame retardant agent (or fire retardant) that is a phosphorus-containing compound or a nitrogen-containing compound. Phosphorus-containing compounds and nitrogen-containing compounds can be used individually or in combination, or can include compounds that comprise any combination of a phosphorus and nitrogen. Nitrogen-containing compounds, that can be used herein, include melamines (including melamine derivatives) such as melamine, melamine cyanurate, melamine polyphosphate, melem, and melon. Phosphorus-containing compounds include organic and inorganic phosphates, phosphonates, organophosphates and/or phoshpinates compounds with different oxidation states.

In some examples, an organophosphate can be used as a flame retardant agent. Such organophosphate compounds include aliphatic phosphates, phosphonates and aromatic phosphonates compounds. The organophosphate compound can be an organophosphonate with four oxygen atoms attached to the central phosphorus; an aliphatic, aromatic, or polymeric organophosphate with 3 oxygen atoms attached to the central phosphorus, or an organophosphinate with 2 oxygen atoms attached to the central phosphorus atom. The liquid fire retardant, or water-soluble flame retardant, can be water-soluble phosphorus-containing compounds. Example of water-soluble phosphorus-containing compound is a phosphonate ester with a phosphorus-containing closed 4-to 6-membered ring structure. An example of such a compound is 5-ethyl-2-methyl-1,3,2-dioxaphosphorinan-5-yl)methyl dimethyl phosphonate P-oxide. Another example is bis[(5-ethyl-2-methyl-1,3,2-dioxaphosphorinan-5-yl)methyl] methyl phosphonate P,P'-dioxide.

Examples of commercially available products, include FR-102 (available from Shanghai Xusen Co Ltd) or Aflammit®-PE and Aflammit®-MSG (both available from Thor). Other examples of flame retardant agents include commercial available products such as Exolit®AP compounds (available from Clariant), Aflammit® compounds (available from Thor), Disflamoll®DPK (available from Lanxess), or Phoslite B compounds (available from Italmatch Chemicals).

In some examples, the barrel layer with flame retardancy (150) is directly built on the surface of the fabric backing (140). The fabric backing can be soaked in a bath containing liquid flame retardant solution or containing a water-soluble flame retardant solution, for examples, and the excess can be rolled out. More specifically, impregnated fabric substrates (prepared by bath, spraying, dipping, etc.) can be passed through padding nip rolls under pressure to provide a dry barrel layer with flame retardancy having a coat weight in the range of from about 0.5 to about 50 gsm, though this range is not limiting. The impregnated fabric, after nip rolling, can then be dried with peak fabric web temperature in the range of about 90° C. to about 250° C.

The barrel layer with flame retardancy (150) may also contain polymeric latex. Such polymeric latex can be polyurethane based latex which is able form a continuous film in which the particles of phosphorus-containing compounds and nitrogen-containing compounds are embedded inside. Further, the barrel layer with flame retardancy may also contain a particle filler or combination of fillers. The fillers can be either inflammable inorganic particles such as calcium carbonate powder, china clay powder and titanium dioxide powder, or flame retardancy powder such as aluminum hydroxide powder and magnesium hydroxide powder.

Method for Forming a Printable Medium Substrate

In some examples, according to the principles described herein, a method for forming a printable medium with a supporting base substrate (110) having, on its image side (101), a substrate sizing layer (120) and an image receiving layer (130), and having, on its back-side (102) a fabric backing (140) and barrel layer with flame retardancy (150) is provided. Such printable medium could be a wall covering medium. FIG. 2 is a flowchart illustrating a method of making the recording medium such as described herein. Such method encompasses providing a supporting base substrate (110); forming a substrate sizing layer (120) on the image side (101) of the printable medium; applying an image receiving layer (130) over said substrate sizing layer (120); applying a fabric backing (140) on the back-side (101) of the printable medium; and, then, applying a barrel layer with flame retardancy (150) over said fabric backing (140).

The method for producing a printable medium includes making the supporting base substrate, using a fourdrinier type paper machine, and, then, applying a substrate sizing layer (120) using either a on-line size press or an off-line coater known in the arts over said substrate. The method further encompasses coating an image receiving layer (130), onto an image side (101) of the composite structure, over the substrate sizing layer (120). The image receiving layer (130) is applied by any coating method. The coating methods may include, but are not limited to blade coating processes, rod coating processes, air-knife coating processes, curtain coating processes, slot coating processes, jet coating processing or any combination thereof. The image receiving layer (130) can be dried by any suitable means, including, but not limited to, convection, conduction, infrared radiation, atmospheric exposure, or other known method.

A calendering process can then be used to achieve the desired gloss or surface smoothness. Calendering is the process of smoothing the surface of the paper by pressing it between nips formed in a pair of rollers. The rollers can be metal hard roll, and soft roll covered with a resilient cover, such as a polymer roll. The resilient-surface roll adapts itself to the contours of the surface of the substrate and presses the opposite side of substrate evenly against the smooth-surface press roll. Any of a number of calendering devices and methods can be used. The calendering device can be a separate super-calendering machine, an on-line calendaring unit, an off-line soft nip calendaring machine, or the like. In some examples, the calendering is carried out at a temperature ranging from about 50 to about 150° C. (metal roll surface temperature) and, in some other examples, from about 80 to about 110° C. The nip pressure can be any value between about 100 to about 500 KN/cm2.

The fabric backing layer (140) is applied to the supporting base substrate via a lamination process. In some examples, the fabric backing layer (140) is integrated with the supporting base substrate (110) using a heating and pressure lamination processing by means of a multiple rolls laminator. The fabric backing layer and the supporting base substrate can be laminated together on a lamination roll at a speed that may range from about 10 meters/minute to 30 meters/minute, and then dried in a dryer using a peak temperature that may range from about 50° C. to about 150° C. A tension within a range of about 60 Newton (N) to about 160 N may be applied to the fabric backing layer. The fabric backing layer may also be coated with a lamination adhesive. Said adhesive can be coated using a metering rod that is facilitated by a pick-up roll.

In some examples, the barrel layer with flame retardancy (150) is applied to the printable medium, over the fabric backing (140). The flame retardancy composition is applied before lamination using a padding processing. Within such padding procedures, the fabric substrate can be soaked in a bath containing the barrel layer with flame retardancy composition. More specifically, impregnated fabric substrates (prepared by bath, spraying, dipping, etc.) can be passed through padding nip rolls under pressure to provide a dry picked up from about 0.5 to about 50 gsm, though this range is not limiting. The impregnated fabric, after nip rolling, can then be dried under heat at any functional time which is controlled by machine speed with peak fabric web temperature in the range of about 90° C. to about 120° C. In some examples, pressure can be applied to the substrate after impregnating the fabric backing with the barrel layer with flame retardancy in a pressure padding operation. During such operation, the substrate is firstly dipped into a pan containing barrel layer with flame retardancy composition and is then passed through the gap of padding rolls. The padding rolls apply the pressure to composite-wetted textile material so that composite amount can be accurately controlled. In some examples, the pressure, that is applied, is between about 10 and about 100 PSI or, in some other examples, is between about 30 to about 70 PSI. In some examples, the barrel layer with flame retardancy (150) can also be applied to the printable medium, over the fabric backing (140), by applying the flame retardancy containing barrel layer composition, after lamination, using a coating processing. The coating techniques, that can be used, are not limited to blade coating processes, rod coating processes, air-knife coating processes, curtain coating processes, slot coating processes, jet coating processing or any combination thereof Examples of lamination equipment include, but are not limited to, Talon 64 (152.4 cm wide web) from GBC, Lincolnshire, Ill.; 62 Pro laminating machine (152.4 cm wide web) from Seal, Elkridge, Md.; and lamination machines from Polytype Converting Ltd., Freiburg, Switzerland. Coating and laminating machines may be obtained from Faustel, Germantown, Wis. and Black Clawson Ltd, Newport, South Wales, UK, for example.

In some examples, the back-side (102) (or non-image side) of the printable medium (100), specifically when used as a wall covering medium, can be pre-applied with an adhesive for adhering to a wall or other surface. In some other examples, the printable medium (100) can be applied on a wall, as a wall covering, using a commercial available adhesive. Examples of commercial wall-adhering adhesives for wall coverings include, but are not limited to, Pro-880 Premium Clear Strippable, Pro-838 Heavy Duty Clear, Pro-543 Universal, ECO-888 Strippable with Mildew Guard, and Golden Harvest Wheat wallpaper adhesives, all from Roman Decorating Products, Ill., USA; Zinsser® Sure Grip®-128 and Zinsser Sure Grip®-132 wallpaper adhesives, both from Rust-Oleum® Corporation, USA; Dynamite® 234, Dynamite® C-11, Dynamite® DEFENDER wallpaper adhesives, each by Gardner-Gibson, Fla., USA; Polycell® Paste the Wall wallpaper adhesive from AkzoNobel Group of Companies, UK; ECOFIX adhesive from Ecofix AB, Sweden; and Metylan and Solvite wallpaper adhesives from Henkel, Germany.

Printing Method

The printing method encompasses obtaining a printable medium with a supporting base substrate having, on its image side, a substrate sizing layer, and an image receiving layer, and having, on its back-side a fabric backing and barrel layer with flame retardancy and, then, applying an ink composition onto said printable medium, to form a printed image. Said printed image will have, for examples, enhanced image quality and image permanence. The printable medium, as disclosed herein, may be used as a wall covering material (e.g., wallpaper) for home or commercial use, for decoration or display. The printable medium can thus be a printable wall covering medium. The printable medium is specifically designed to receive any inkjet printable ink, such as, for example, organic solvent-based inkjet inks or aqueous-based inkjet inks The ink composition forms an image on the image side of the printable medium or on the image side of wall covering medium.

The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezo-electric inkjet printing. Representative examples of printers used to print on the printable medium or wall covering medium, as defined herein, include, but are not limited to, HP DesignJet printers: L25500, L26500, and L65500; HP Scitex printers: LX600, LX800, LX850, and TurboJet 8600 UV from Hewlett-Packard Company. Representative inkjet inks used by the above-listed printers include, but are not limited to, HP 791, HP 792, and HP Scitex TJ210. The printers may be used in a standard wall paper profile with a production print mode or a normal print mode. The print mode may vary the ink application within a range of from about 50% to about 250% of each other.

Some examples of inkjet inks that may be deposited, established, or otherwise printed on the printable medium of the present disclosure include pigment-based inkjet inks, dye-based inkjet inks, pigmented latex-based inkjet inks, and UV curable inkjet inks Additionally, the printable mediums are also designed to receive thereon a solid toner or a liquid toner. The solid toner or the liquid toner may include toner particles made, e.g., from a polymeric carrier and one or more pigments. The liquid toner may be an organic solvent-based (e.g., hydrocarbon) liquid toner. The solid toner or the liquid toner may be deposited, established, or otherwise printed on the examples of the printable medium using, respectively, a suitable dry or liquid press technology, such as a dry toner electrophotographic printing device or a liquid toner electrophotographic printing device.

In some examples, the ink composition is an inkjet ink composition and contains one or more colorants that impart the desired color to the printed message. As used herein, "colorant"includes dyes, pigments, and/or other particulates that may be suspended or dissolved in an ink vehicle. The colorant can be present in the ink composition in an amount required to produce the desired contrast and readability. In some other examples, the ink compositions include pigments as colorants. Pigments that can be used include self-dispersed pigments and non-self-dispersed pigments. Any pigment can be used; suitable pigments include black pigments, white pigments, cyan pigments, magenta pigments, yellow pigments, or the like. Pigments can be organic or inorganic particles as well known in the art. As used herein, "liquid vehicle" is defined to include any liquid composition that is used to carry colorants, including pigments, to a substrate. A wide variety of liquid vehicle components may be used and include, as examples, water or any kind of solvents.

In some other examples, the ink composition that is applied to print medium is an ink composition containing latex components. Latex components are, for examples, polymeric latex particulates. Therefore, is some examples, the ink composition contain polymeric latex particulates in an amount representing from about 0.5 wt % to about 15 wt % based on the total weight of the ink composition. The polymeric latex refers herein to a stable dispersion of polymeric micro-particles dispersed in the aqueous vehicle of the ink. The polymeric latex can be natural latex or synthetic latex. Synthetic latexes are usually produced by emulsion polymerization using a variety of initiators, surfactants and monomers. In various examples, the polymeric latex can be cationic, anionic, or amphoteric polymeric latex. Monomers that are often used to make synthetic latexes include ethyl acrylate; ethyl methacrylate; benzyl acrylate; benzyl methacrylate; propyl acrylate; propyl methacrylate; iso-propyl acrylate; iso-propyl methacrylate; butyl acrylate; butyl methacrylate; hexyl acrylate; hexyl methacrylate; octadecyl methacrylate; octadecyl acrylate; lauryl methacrylate; lauryl acrylate; hydroxyethyl acrylate; hydroxyethyl methacrylate; hydroxyhexyl acrylate; hydroxyhexyl methacrylate; hydroxyoctadecyl acrylate; hydroxyoctadecyl methacrylate; hydroxylauryl methacrylate; hydroxylauryl acrylate; phenethyl acrylate; phenethyl methacrylate; 6-phenylhexyl acrylate; 6-phenylhexyl methacrylate; phenyllauryl acrylate; phenyllauryl methacrylate; 3-nitrophenyl-6-hexyl methacrylate; 3-nitrophenyl-18-octadecyl acrylate; ethyleneglycol dicyclopentyl ether acrylate; vinyl ethyl ketone; vinyl propyl ketone; vinyl hexyl ketone; vinyl octyl ketone; vinyl butyl ketone; cyclohexyl acrylate; methoxysilane; acryloxypropyhiethyldimethoxysilane; trifluoromethyl styrene; trifluoromethyl acrylate; trifluoromethyl methacrylate; tetrafluoropropyl acrylate; tetrafluoropropyl methacrylate; heptafluorobutyl methacrylate; butyl acrylate; iso-butyl methacrylate; 2-ethylhexyl acrylate; 2-ethylhexyl methacrylate; isooctyl acrylate; and iso-octyl methacrylate. In some examples, the latexes are prepared by latex emulsion polymerization and have a weight average molecular weight ranging from about 10,000 Mw to about 5,000,000 Mw. The polymeric latex can be selected from the group consisting of acrylic polymers or copolymers, vinyl acetate polymers or copolymers, polyester polymers or copolymers, vinylidene chloride polymers or copolymers, butadiene polymers or copolymers, styrene-butadiene polymers or copolymers and acrylonitrile-butadiene polymers or copolymers. The latex components are on the form of a polymeric latex liquid suspension. Such polymeric latex liquid suspension can contain a liquid (such as water and/or other liquids) and polymeric latex particulates having a size ranging from about 20 nm to about 500 nm or ranging from about 100 nm to about 300 nm.

EXAMPLES

The raw materials and the chemical components used in making illustrating samples are listed in Table 1.

TABLE 1

| Ingredients | Nature of the ingredients | Supplier |
| --- | --- | --- |
| Hydrocarb ®60 | Calcium carbonate pigment | Omya North America |
| Hydrocarb ®90 | Calcium carbonate pigment | Omya North America |

TABLE 1-continued

| Ingredients | Nature of the ingredients | Supplier |
| --- | --- | --- |
| HP916M | Acrylic polymeric latex | Hewlett Packard Co |
| Joncryl ®98 | Acrylic polymeric latex | BASF |
| BYK-Dynwet ®800 | silicone-free Surfactant | BYK USA, Inc. |
| Alcosperse ®149 | Disperse agent | Alco Chemical |
| 2-pyrrolidinone | Film forming agent | Aldrich Inc. |
| Panford ®290 | Ethylated starch | Panford Inc. |
| BUDIT ® IS 3001 | Flame Retardant | Budenheim Inc. |
| PT 9619 latex | Acrylic polymeric latex | Omnova Inc. |
| Omyafill ® | Inorganic filler | Omya, Inc. |
| Hycar ® 26871 | Polymeric emulsion | Lubrizol Inc. |
| Aflammit ®TL 1313 | Flame retardant | Thor |

The illustrating sample, Sample A, in accordance with the principles described herein, is a digital printing media used in wall covering application. The composition of SAMPLE A is detailed in Table 2. Comparative examples 1, 2 and 3 are commercial available digital printing medium marked as " Home and Commercial Use Wall Paper". Detailed structures of these medium are shown in table 3.

TABLE 2

Sample A

| Nature of the ingredients | Tradename of the ingredients | Wt parts in each layer |
| --- | --- | --- |
| Image receiving layer (130) | | |
| Calcium carbonate pigment | Hydrocarb ®60 | 80 |
| Calcium carbonate pigment | Hydrocarb ®90 | 20 |
| Acrylic polymeric latex | HP916M | 12 |
| Acrylic polymeric latex | Joncryl ®98 | 8 |
| Surfactant | BYK-Dynwet ®800 | 0.5 |
| Disperse agent | Alcosperse ®149 | 0.3 |
| Film forming agent | 2-pyrrolidinone | 5 |
| Substrate sizing layer (120) | | |
| Ethylated starch | Panford ® 290 | 100 |
| Flame Retardant | BUDIT ® IS 3001 | 40 |
| Surfactant | BYK-Dynwet ®800 | 0.3 |
| Supporting base substrate (110) | | |
| Natural fiber | Hardwood/softwood | 85/15 |
| Polymer fiber non-woven composite | short polyethylene fiber | 16 |
| Acrylic polymeric latex | PT 9619 latex | 12 |
| Inorganic filler | Omyafill ® | 8 |
| Fabric backing (140) | | |
| Polyester/fabric | yarn count of 46 by 48 | 90 |
| Cotton woven | | 10 |
| Barrel layer (150) | | |
| Polymeric emulsion | Hycar ® 26871 | 100 |
| Flame retardant | Aflammit ®TL 1313 | 60 |
| Surfactant | BYK-Dynwet ®800 | 0.5 |

TABLE 3

| Media structures (in gsm) | SAMPLE A | Comparative sample 1 | Comparative sample 2 | Comparative sample 3 |
| --- | --- | --- | --- | --- |
| Image receiving layer | 17 gsm | 25 gsm | 24 gsm | — |
| Substrate sizing layer | 8 gsm | — | — | — |
| Composite Supporting Core | 180 gsm | 152 gsm | 180 gsm | 300 gsm |
| Fabric backing | 180 gsm | — | 105 | 170 gsm |
| Barrel layer | 8 gsm | — | — | — |

Sample A and comparative samples 1, 2 and 3 are evaluated according to an industrial standard for durable wall coverings known as ASTM F793, "Standard Classification of Wall Covering by Use Characteristic" (version 2010 substantially followed Federal Specification CCC-W-408D), which defines the durability requirements of wall coverings from "decorative"wall coverings (Category I) to more stringent use cases defined as "commercial serviceability"wall coverings Type I (Category IV), Type II (Category V), Type III (Category VI) and up to "Type IV".

Sample A and comparative samples 1, 2 and 3 are printed using an HP DesignJet L26500 printer equipped with HP 792 latex inks, using a six color process and 110° C. drying temperature at a speed of 100 square feet per hour (a 10 pass bidirectional color profile). An image is created on each sample with an equal percentage of each of the six ink colors. Per ASTM F793, the image includes many different colors. The printed mediums are then evaluated for different performances: Scrubbability, Breaking Strength, Fire Retardancy performances, stain removal performances and image quality.

The scrubbability test (solvent resistance), in accordance with ASTM F793, is performed by exposing the various Samples to be tested, to a nylon bristle brush and detergent solution (made in accordance with "Note 1" under section 7.4.1 of ASTM F793) in a BYK Abrasion Tester (from BYK-Gardner USA, Columbus, MD) with a linear, back-and-forth action, attempting to wear down the image side of the Samples (300 cycles of a nylon brush over a printed surface, wet with trisodium-phosphate based cleaning solution). After the test is concluded, the Samples are rated "pass" or "fail" according to the guidelines listed in 7.7.2 and the visual rating criteria listed in 7.4.2 of ASTM F793. The scrubbability results show the numbers of cycles completed until wear is visible. The results, in Table 4, express the number of cycles after which the samples fail the test (i.e. the number of brush cycles until visual defect is seen).

The breaking strength test (tensile strength), in accordance with ASTM F793, is performed in HP's Analytical Services Lab by exposing the Samples to a standard force-gauge tester, Instron Model No. 5566 (Tensile & Tear Instrument, from Instron). Two clamps are used to grasp longer ends of rectangular shaped specimens of the respective Samples and then to pull with increasing force until failure occurred (i.e., separation of the material). The Average Breaking Strength are expressed in (kg-force/mm) for the Machine Direction (MD) and for the Cross-Machine Direction (CMD). The results, in Table 4, express average tensile breaking strength in kg-force/mm.

The fire Retardancy test is evaluated according to the ASTM F793 & ASTM E84 methods. 2 ft wide×25 ft long unprinted samples are applied to gypsum wall board and ignited. Flame Spread Index (FSI) must be inferior to 25 to order to pass the test. The results, in Table 4, shows the FSI and whether or not, the samples are passing the test.

The Stain test is evaluated according to the ASTM F793 method (section 7.5.1) that directs to lay specimens horizontally with decorative surface upwards. 12 reagents are placed onto the surface, covered with a watch glass, then removed after 24 hrs. Each spot is visually rated. The passing criteria is stated as "there shall be no evidence of appreciable change to the decorative surface". The "stain rating handbook" is used to facilitate the visual ranking, thereby defining a 1-5 ranking system in which the rating from 1 to 3.5 are considered a "FAIL", and from 4 to 5 are considered to be a "PASS". To meet ASTM F793 Type II criteria, the sample must have a PASS ranking for all 12 reagents. The reagents as listed in ASTM F793 are: DI water 18.3 degrees Celsius to 23.8 degrees Celsius, DI water 46.1 degrees Celsius to 51.6 degrees Celsius, EtOH, Vinegar, 3%, Alkali solution, HCl, 5%, Soap solution, Pure orange juice, Butter, Catsup, Tea. The results, in Table 4, illustrate the Visual assessment on all reagents, a rank superior to 4 is considered as passing the test.

The results of these tests are illustrated in Table 4 below. Such results demonstrate that the sample A (according to the principles described herein) passes all tests (Pass type II test).

TABLE 4

| Samples | Tear Strength (gf) MD | Tear Strength (gf) CMD | Scrubbabiliy | Fire Retardancy (FSI) | Stain | Image quality |
|---|---|---|---|---|---|---|
| Sample A | 11,860 (Pass Type II) | 8,840 (Pass Type II) | 300 (Pass Type II) | 20 (Pass Type II) | Pass | Very good |
| Comparative sample 1 | 181 (Does not pass Type II) | 181 (Does not pass Type II) | 250 (Does not pass Type II) | 15 (Pass Type II) | Does not pass | Very good |
| Comparative sample 2 | 6396 (Pass Type II) | 6396 (Pass Type II) | 172 (Does not pass Type II) | 45 (Does not pass Type II) | Does not pass | good |
| Comparative sample 3 | 1089 (Pass Type II) | 1089 (Pass Type II) | 300 (Pass Type II) | 25 (Pass Type II) | Does not pass | poor |

The invention claimed is:

1. A printable medium, comprising:
   a supporting base substrate having a front side and a back-side opposed to the front side;
   a substrate sizing layer disposed directly on the front side;
   an image receiving layer disposed on the substrate sizing layer;
   a fabric backing layer disposed on the back-side; and
   a barrel layer with flame retardancy disposed directly on the fabric backing layer.

2. The printable medium of claim 1 wherein the supporting base substrate is a composite supporting core substrate.

3. The printable medium of claim 1 wherein the supporting base substrate contains a synthetic polymeric fiber as a first constituent material and a natural fiber as a second constituent material.

4. The printable medium of claim 1 wherein the supporting base substrate further contains a polymeric binder.

5. The printable medium of claim 1 wherein the substrate sizing layer contains starch or modified starch products and a flame retardant agent.

6. The printable medium of claim 1 wherein the coat weight of the substrate sizing layer is within a range of about 0.1 gsm to about 10 gsm.

7. The printable medium of claim 1 wherein the image receiving layer comprises pigment fillers, polymeric binders and latex film-forming agents.

8. The printable medium of claim 1 wherein the coat weight of the image receiving layer is within a range of about 5 gsm to about 30 gsm.

9. The printable medium of claim 1 wherein the fabric backing layer is a woven, non-woven, knitted or tufted fabric structure.

10. The printable medium of claim 1 wherein the fabric backing layer includes an adhesive compound.

11. The printable medium of claim 1 wherein the barrel layer with flame retardancy contains a flame retardant agent that is a phosphorus-containing compound or a nitrogen-containing compound.

12. A method for forming a printable medium, comprising:
  a. providing a supporting base substrate having a front side and a back-side opposed to the front side;
  b. forming a substrate sizing layer directly on the front side of said supporting base substrate;
  c. applying an image receiving layer on said substrate sizing layer;
  d. applying a fabric backing layer on the back-side of the supporting base substrate;
  e. and, then, applying a barrel layer with flame retardancy directly on said fabric backing layer.

13. A method of using the printable medium of claim 1, the method comprising:
  applying an ink composition onto said printable medium to form a printed image.

14. The method of claim 13 wherein the ink composition is applied to the printable medium via inkjet printing techniques.

15. The method of claim 13 wherein the ink composition is an ink composition containing latex components.

16. The printable medium of claim 1 wherein the barrel layer comprises:
  a flame retardant agent selected from the group consisting of melamine, melamine cyanurate, melamine polyphosphate, melem, melon, organic phosphates, inorganic phosphates, phosphonates, organophosphates, phoshpinates, and mixtures thereof; and
  a polyurethane latex.

17. The printable medium of claim 16 wherein the flame retardant agent is selected from the group consisting of 5-ethyl-2-methyl-1,3,2-dioxaphosphorinan-5-yl)methyl dimethyl phosphonate P-oxide and bis[(5-ethyl-2-methyl-1,3,2-dioxaphosphorinan-5-yl)methyl] methyl phosphonate P,P'-dioxide.

18. The printable medium of claim 16 wherein the barrel layer further comprises: inorganic particles; or flame retardancy powder; or combinations thereof.

19. The printable medium of claim 18 wherein:
  the inorganic particles are selected from the group consisting of calcium carbonate powder, china clay powder, titanium dioxide powder, and combinations thereof; and
  the flame retardancy powder is selected from the group consisting of aluminum hydroxide powder, magnesium hydroxide powder, and combinations thereof.

* * * * *

UNITED STATES PATENT AND TRADEMARK OFFICE
CERTIFICATE OF CORRECTION

PATENT NO. : 9,855,781 B2  
APPLICATION NO. : 14/896909  
DATED : January 2, 2018  
INVENTOR(S) : Zhou et al.

Page 1 of 1

It is certified that error appears in the above-identified patent and that said Letters Patent is hereby corrected as shown below:

In the Drawings

In FIG. 2, box 3, delete "A IMAGE" and insert -- AN IMAGE --, therefor.

Signed and Sealed this  
Twenty-fourth Day of July, 2018

Andrei Iancu  
*Director of the United States Patent and Trademark Office*